UNITED STATES PATENT OFFICE.

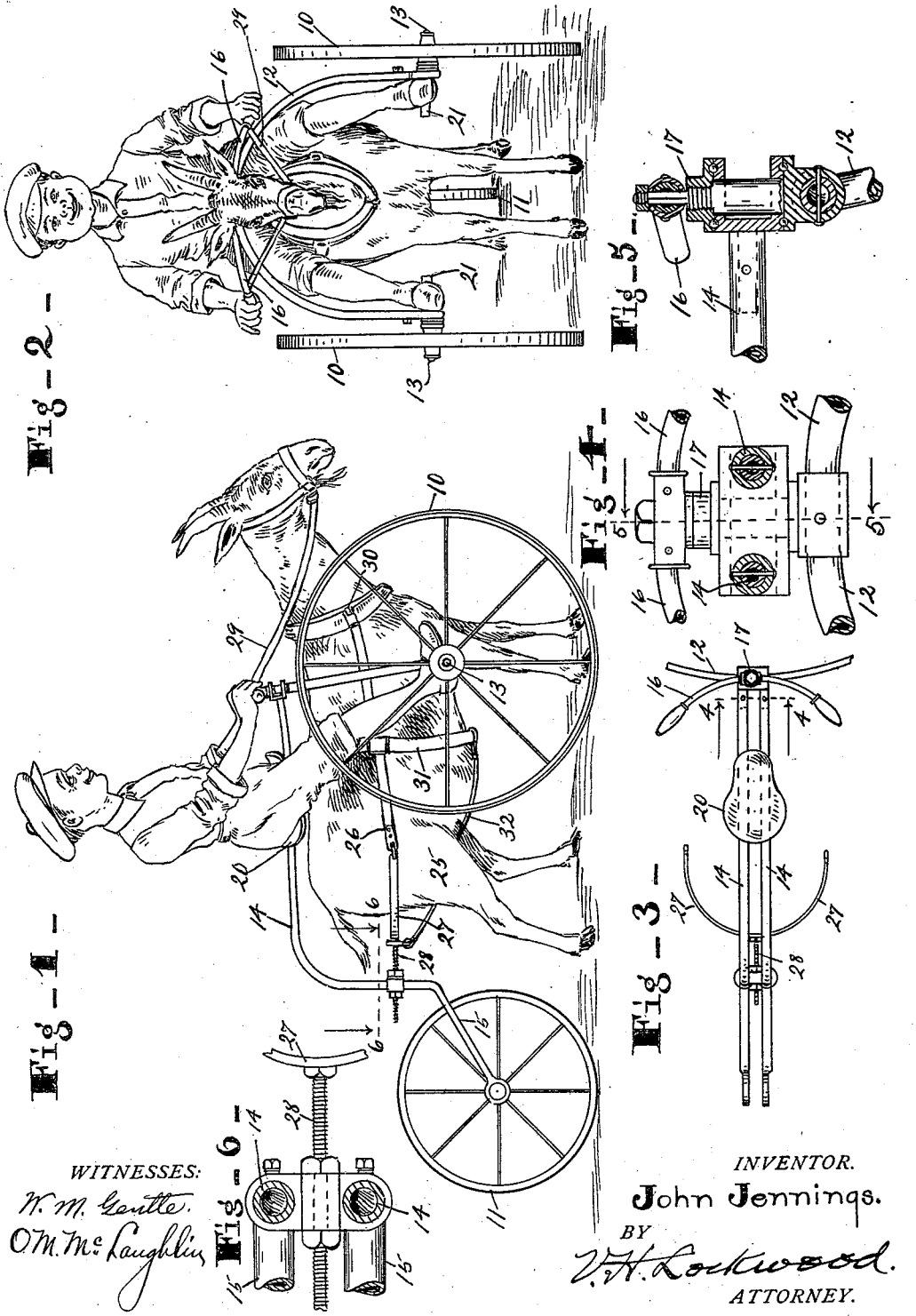

JOHN JENNINGS, OF GREENWOOD, INDIANA.

VEHICLE.

990,440.

Specification of Letters Patent.   Patented Apr. 25, 1911.

Application filed April 28, 1910.   Serial No. 558,121.

*To all whom it may concern:*

Be it known that I, JOHN JENNINGS, of Greenwood, county of Johnson, and State of Indiana, have invented a certain new and useful Vehicle; and I do hereby declare that the following is a full, clear, and exact description thereof, reference being had to the accompanying drawings.

The object of this invention is to provide a vehicle with a saddle thereon and to be guided by the rider and drawn by an animal under the rider. Hence the animal does not support the rider, but the device gives the appearance of the rider on the animal whereas he is riding on the vehicle in a position that he seems to be riding on the animal and to enable him to guide both animal and vehicle.

In the drawings Figure 1 is the side elevation of the device in use by a boy and using a goat. Fig. 2 is the front elevation of the same. Fig. 3 is a plan view of the frame with the wheels omitted. Fig. 4 is a section on line 4—4 of Fig. 3, Fig. 5 is a section on line 5—5 of Fig. 4. Fig. 6 is a section on line 6—6 of Fig. 1.

In detail the device shown herein is a tricycle in a reverse position as compared with the usual tricycle. It has two front wheels 10 and a rear wheel 11. The frame consists of the front transverse bow 12 mounted on stub axles 13 in the front wheels and a top brace or bar 14 running rearwardly from the upper portion of the bow 12 and at its rear end turned downwardly and provided with forks 15 for the rear wheel 11. The bow 12 is pivotally connected with the top bar 14 so as to oscillate horizontally, like the front fork of a bicycle, for guiding purposes. The details of the construction of this part of the device is shown in Figs. 4 and 5 and handle bars 16 of the usual bicycle type are mounted on the bar 17 that extends upwardly from the bow 12.

The seat 20 is mounted on the top bar 14 in position for the rider to place his feet on the bars 21 extending inwardly from the lower part of the bow 12. This enables the boy to use his feet to assist in steering the device and also for holding himself on the seat.

A goat 25 is shown hitched under bow 12 and top bar 14 and saddle 20 in position so that it appears that the boy is riding the goat. The goat is harnessed with traces 26 that are hitched to a curved swingle tree 27 fastened centrally to a threaded rod 28 which is adjustably mounted to a horizontal position in the rear part of frame bar 14. The goat has a bridle rein 29 and also a collar and hames 30 and belly-band 31 with a strip 32 extending rearwardly from the belly-band between the goat's hind legs connected with the traces and to the swingle tree 27. Since the swingle tree 27 is horizontal, the belly-band and other parts of the harness will prevent the animal from lying down. This makes it peculiarly useful when a dog is hitched to the vehicle.

What I claim as my invention and desire to secure by Letters Patent is:

1. A vehicle including two front wheels, a frame with a front bow mounted on said front wheels and curved upwardly so an animal can be hitched under the bow and between the wheels, and a rearwardly extending bar to which said front bow is pivoted at its upper end, means for oscillating said front bow for steering the vehicle, a saddle on the upper frame bar behind the steering means, and means connected with the rear part of the frame to which an animal may be hitched so that the animal would be under the frame and the saddle thereon.

2. A vehicle including two front wheels, a frame with a front bow mounted on said front wheels and curved upwardly so an animal can be hitched under the bow and between the wheels, and a rearwardly extending bar to which said front bow is pivoted at its upper end, handlebars secured to the upper part of the front bow for oscillating said front bow to steer the vehicle, a saddle on the upper frame bar behind the steering means, and means connected with the rear part of the frame to which an animal may be hitched so that the animal would be under the frame and the saddle thereon.

3. A vehicle including two front wheels, a frame with a front bow mounted on said front wheels and a rearwardly extending bar to which said front bow is pivoted at its upper end, a foot rest secured to lower part of the bow at each side for oscillating said front bow to steer the vehicle, a saddle on the upper frame bar behind the steering means, and means connected with the rear part of the frame to which an animal may be hitched so that the animal would be under the frame and the saddle thereon.

4. A tricycle with two wheels in front, a frame having a front bow mounted on the front wheels and a bar extending rearwardly from the upper part of the front bow to the rear wheel, the front bow being mounted in connection with the said bar so as to be horizontally oscillated, handle bars secured to the lower part of the front bow, a foot rest secured to the lower part of the front bow, a saddle on the said upper bar behind the handlebars, and a horizontally disposed swingle tree secured to the rear part of the frame.

In witness whereof, I have hereunto affixed my signature in the presence of the witnesses herein named.

JOHN JENNINGS.

Witnesses:
　G. H. BOINK,
　H. J. WELLS.

---

Copies of this patent may be obtained for five cents each, by addressing the "Commissioner of Patents, Washington, D. C."